United States Patent
Chen et al.

(10) Patent No.: US 7,434,112 B2
(45) Date of Patent: Oct. 7, 2008

(54) SYSTEM AND METHOD FOR VERIFYING VALIDITY OF ASSEMBLED PCI DEVICES OF A COMPUTER

(75) Inventors: Kai Chen, Shenzhen (CN); Ru-Da Xu, Shenzhen (CN); Wei-Sheng Lin, Shenzhen (CN); Wen-Chih Hsu, Shenzhen (CN)

(73) Assignees: Hong Fu Jin Precision Industry (ShenZhen) Co., Ltd., ShenZhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 345 days.

(21) Appl. No.: 11/308,571

(22) Filed: Apr. 8, 2006

(65) Prior Publication Data

US 2006/0242347 A1    Oct. 26, 2006

(51) Int. Cl.
*G06F 11/00* (2006.01)

(52) U.S. Cl. ........................................ 714/56
(58) Field of Classification Search ............... 714/56, 714/57, 43, 46, 47, 37
See application file for complete search history.

(56) References Cited

U.S. PATENT DOCUMENTS

| | | | | |
|---|---|---|---|---|
| 5,630,076 A | * | 5/1997 | Saulpaugh et al. | 710/104 |
| 5,802,365 A | * | 9/1998 | Kathail et al. | 719/321 |
| 5,905,744 A | * | 5/1999 | Reise et al. | 714/821 |
| 6,018,810 A | * | 1/2000 | Olarig | 714/43 |
| 6,587,813 B1 | * | 7/2003 | Whitt et al. | 702/186 |
| 2004/0071092 A1 | | 4/2004 | Pfeifer | |

* cited by examiner

*Primary Examiner*—Nadeem Iqbal
(74) *Attorney, Agent, or Firm*—Wei Te Chung

(57) ABSTRACT

A system for verifying the validity of assembled PCI devices of a computer includes: a device database (2) for storing data of PCI devices being inserted in PCI slots of a computer; a slot database (3) for storing PCI slot data of the computer; a data checking module (1) for obtaining the computer's PCI device data and PCI slot data from the device database and the slot database, integrating the PCI device data and PCI slot data, generating configuration data of a PCI device, and determining whether the PCI device is assembled with validity. A method for verifying the validity of assembled PCI devices of a computer is also disclosed.

6 Claims, 2 Drawing Sheets

SYSTEM AND METHOD FOR VERIFYING VALIDITY OF ASSEMBLED PCI DEVICES OF A COMPUTER

FIELD OF THE INVENTION

The present invention generally relates to systems and methods for verifying the validity of assembled computer hardware, and more particularly, to a system and method for verifying the validity of assembled peripheral component interconnect (PCI) devices of a computer.

DESCRIPTION OF RELATED ART

A computer motherboard comes with a plurality of PCI slots for installing numerous PCI components such as soundcards, network cards, display cards etc. to enhance the functions of a computer. Installing these PCI devices is not easy, and requires a significant amount of time spent on configuring the PCI device's software and hardware as well as the main computer system to ensure that the PCI device is installed successfully. A successful installation of PCI device software includes choosing the correct and most updated PCI device driver corresponding to the computer's operating system, a confusing task because of the abundant of software packages to choose from. Furthermore, the PCI slot of the residing PCI device may also be a determining factor in choosing the software bundle, yet, it is often the case where the PCI device manufacturer fails to provide the software bundle for a given combination of Operating System and PCI slot. Thus, installing multiple PCI devices could create a catastrophe when trying to find the correct PCI slot for each PCI device to avoid data conflicts causing the efficient running of the computer system as a whole.

What is needed, therefore, is a system and method that can verify the validity of assembled PCI devices efficiently.

SUMMARY OF INVENTION

One embodiment of the present invention provides a system for verifying the validity of assembled PCI devices of a computer. The system includes a data checking module, a device database, and a slot database. The device database is used for storing data of PCI devices being inserted in PCI slots of the computer. The slot database is used for storing PCI slot data of the computer. The data checking module is used for obtaining the computer's PCI device data and PCI slot data from the device database and the slot database, integrating the PCI device data and PCI slot data, generating configuration data of a PCI device, and determining whether the PCI device is assembled validly.

One embodiment of the present invention provides a method for verifying the validity of assembled PCI devices of a computer. The method includes the steps of: storing PCI device data and PCI slot data respectively into a device database and a slot database; downloading the PCI device data and the PCI slot data; reading a PCI data list from the BIOS of the computer; obtaining location data of a PCI slot from the PCI data list; obtaining PCI bus data and PCI device number from the PCI data list; integrating the obtained PCI bus data, the obtained PCI device number, and the downloaded PCI device data into configuration data of the PCI devices of the computer; reading current data of the PCI devices of the computer; determining whether the configuration data is the same as the current data; and returning a message of invalidly assembled PCI devices of the computer if the configuration data is different from the current data.

Other advantages and novel features of the present invention will become more apparent from the following detailed description of preferred embodiments when taken in conjunction with the accompanying drawings.

DETAILED DESCRIPTION

Figure 1:
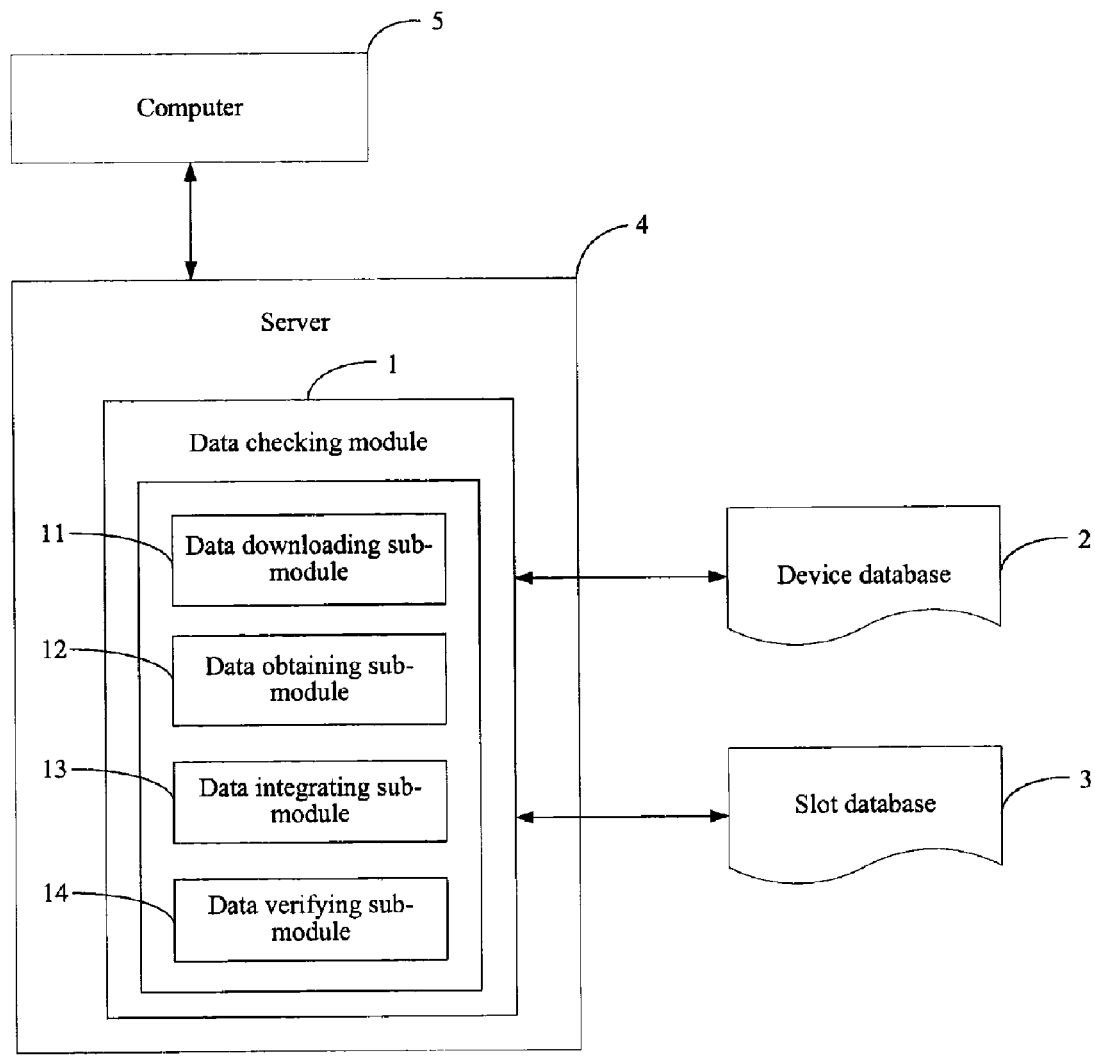
FIG. 1 is a schematic diagram of a system for verifying the validity of assembled peripheral component interconnect devices of a computer 5 in accordance with a preferred embodiment.

FIG. 1 is a schematic diagram of a system for verifying the validity of assembled peripheral component interconnect (PCI) devices of a computer 5 in accordance with a preferred embodiment. The PCI validating system for verifying validity of assembling PCI devices typically includes a server 4 having a data checking module 1 installed therein, a device database 2 for storing PCI device data 2, and a slot database 3 for storing PCI slot data. The data checking module 1 is used for obtaining and integrating data from the PCI device and the PCI slot of the computer 5 to be verified, generating configuration data of PCI devices of the computer 5, and determining whether the PCI devices of the computer 5 is assembled validly. The device database 2 is used for storing data of the PCI devices being inserted in corresponding PCI slots on a motherboard of the computer 5. The data stored in the device database 2 may include: device identification (DevID), function number (FunNo), and vender identification (VenID). The slot database 3 is used for storing the PCI slot data of the computer 5. Each PCI device has a corresponding PCI slot data, which may include a PCI slot number (SlotNo) and a corresponding device identification (DevID).

The data checking module 1 typically includes a data downloading sub-module 11, a data obtaining sub-module 12, a data integrating sub-module 13, and a data verifying sub-module 14.

The data downloading sub-module 11 is used for downloading the PCI device data from the device database 2, and downloading the PCI slot data from the slot database 3 into the server 4.

The data obtaining sub-module 12 is used for reading a PCI data list from the computer 5 through a system interrupt mode and the downloaded PCI slot data. The data obtaining sub-module 12 is further used for obtaining location data of a PCI slot from the PCI data list through the PCI slot number (SlotNo) that is contained in the downloaded PCI slot data. The data obtaining sub-module 12 is further used for obtaining PCI bus data (BusNo) and PCI device number (DevNo) from the PCI data list through the location data of the PCI slot. The PCI data list which is stored in Basic Input Output System (BIOS) of the computer 5, is used for storing PCI slot number (SlotNo), location data of PCI slots (SlotID), PCI bus data (BusNo), and PCI device number (DevNo) of the computer. The PCI device number (DevNo) is used for identifying a corresponding PCI device. The data obtaining sub-module 12 is further used for reading current data of the PCI device. The current data of the PCI device may be shown as follows: PCI.BusNo=2, PCI.DevNo=1, PCI.DevID=3, PCI.FunNo=4, and PCI.VenID=0x001.

The data integrating sub-module 13 is used for integrating the PCI bus data (BusNo) and PCI device number (DevNo)

both of which are obtained by the data obtaining sub-module 12 and the PCI device data that is downloaded by the data downloading sub-module 11 into the configuration data of the PCI devices. The configuration data of the PCI devices may be shown as follows: PCI.BusNo=1, PCI.DevNo=2, PCI.DevID=3, PCI.FunNo=4, and PCI.VenID=0x001.

The data verifying sub-module 14 is used for determining whether the configuration data integrated by the data integrating sub-module 13 is the same as the current data read by the data obtaining sub-module 12. The data verifying sub-module 14 is further used for returning a message showing whether the PCI devices of the computer is assembled validly.

Figure 2:
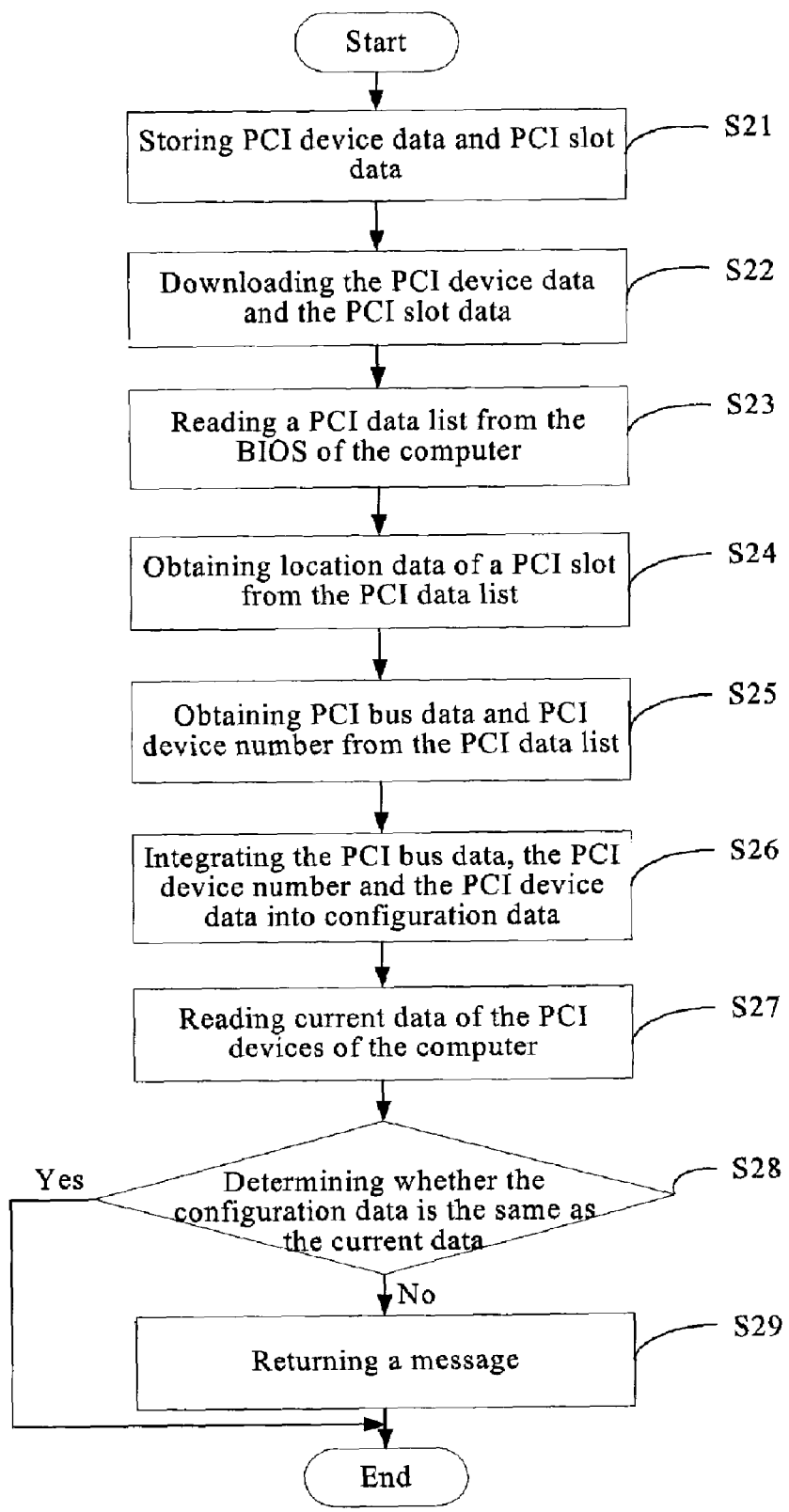
FIG. 2 is a flowchart of a preferred method for verifying the validity of assembled peripheral component interconnect devices of a computer.

FIG. 2 is a flowchart of a preferred method for verifying the validity of assembled PCI devices of a computer 5 by utilizing the system of FIG. 1. If a user wants to verify the validity of an assembled PCI device of computer 5, in step S21, the user controls the server 4 to upload PCI device data and PCI slot data provided by their manufacturers into device database 2 and slot database 3 respectively. In step S22, the Central Processing Unit (CPU) of a server 4 activates the data downloading sub-module 11. The data downloading sub-module 11 downloads PCI device data and PCI slot data contained in the device database 2 and the slot database 3 into the server 4. In step S23, the CPU activates the data obtaining sub-module 12. The data obtaining sub-module 12 reads a PCI data list from the BIOS of the computer 5 through system internal interruption; a system used to run internal instructions. In step S24, the data obtaining sub-module 12 obtains location data of a PCI slot from the PCI data list through the PCI slot number (SlotNo) that is contained in the PCI slot data downloaded by the data downloading sub-module 11. In step S25, the data obtaining sub-module 12 obtains PCI bus data (BusNo) and PCI device number (DevNo) from the PCI data list through the location data of the PCI slot. In step S26, the CPU activates the data integrating sub-module 13. The data integrating sub-module 13 integrates the obtained PCI bus data (BusNo), the obtained PCI device number (DevNo), and the downloaded PCI device data into configuration data of the PCI device of the computer 5. The configuration data may be shown as follows: PCI.BusNo=1, PCI.DevNo=2, PCI.DevID=3, PCI.FunNo=4, and PCI.VenID=0x001. In step S27, the data obtaining sub-module 12 reads the current data of the PCI device of the computer 5. The current data may be shown as follows: PCI.BusNo=2, PCI.DevNo=1, PCI.DevID=3, PCI.FunNo=4, and PCI.VenID=0x001. In step S28, the CPU activates the data verifying sub-module 14. The data verifying sub-module 14 determines whether the configuration data is the same as the current data. If the configuration data is different from the current data, in step S29, the data verifying sub-module 14 returns a message that shows the PCI device of the computer 5 is assembled wrongly. Otherwise, if the configuration data is the same as the current data, the procedure ends.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for verifying the validity of assembled PCI devices of a computer, the system comprising:
    a device database for storing data of PCI devices being inserted in corresponding PCI slots of the computer;
    a slot database for storing PCI slot data of the computer; and
    a data checking module for obtaining the computer's PCI device data and PCI slot data from the device database and the slot database, integrating the PCI device data and PCI slot data, generating configuration data of a PCI device, and determining whether the PCI device is assembled with validity.

2. The system as claimed in claim 1, wherein the data checking module comprises:
    a data downloading sub-module for downloading PCI device data from the device database and PCI slot data from the slot database;
    a data obtaining sub-module for reading a PCI data list from the computer, obtaining location data of a PCI slot from the PCI data list, obtaining PCI bus data and PCI device number from the PCI data list through the location data of the PCI slot, and reading current data of the PCI devices;
    a data integrating sub-module for integrating the PCI bus data, the PCI device number and the PCI device data into configuration data of PCI devices of the computer; and
    a data verifying sub-module for determining whether the configuration data of the PCI devices is the same as the current data of the PCI devices.

3. The system as claimed in claim 2, wherein the data verifying sub-module is further used for returning a message showing whether the PCI devices of the computer is assembled validly.

4. The system as claimed in claim 1, wherein each PCI device corresponds to a PCI slot data.

5. A method for verifying the validity of assembled PCI devices of a computer, the method comprising the steps of:
    storing PCI device data and PCI slot data respectively into a device database and a slot database;
    downloading the PCI device data and the PCI slot data;
    reading a PCI data list from the BIOS of the computer;
    obtaining location data of a PCI slot from the PCI data list;
    obtaining PCI bus data and PCI device number from the PCI data list;
    integrating the obtained PCI bus data, the obtained PCI device number and the downloaded PCI device data into configuration data of the PCI devices of the computer;
    reading current data of the PCI devices of the computer;
    determining whether the configuration data is the same as the current data; and
    returning a message of invalidly assembled PCI devices of the computer if the configuration data is different from the current data.

6. The method according to claim 5, wherein each PCI device corresponds to a PCI slot data.

* * * * *